United States Patent [19]

Ditullio et al.

[11] Patent Number: 5,134,414
[45] Date of Patent: Jul. 28, 1992

[54] RADAR DUPLEXER LEAKAGE SPIKE SUPPRESSOR

[75] Inventors: Joseph G. Ditullio, Woburn; Peter D. Dolan, Wakefield, both of Mass.; Edward H. Shively, Raymond, Me.; William R. Romaine, Acton, Mass.

[73] Assignee: Massachusetts Institute of Technology, Cambridge, Mass.

[21] Appl. No.: 672,464

[22] Filed: Mar. 20, 1991

[51] Int. Cl.$^5$ ............................................. G01S 7/285
[52] U.S. Cl. ........................................ 342/198; 342/52
[58] Field of Search ........................... 342/198, 52, 54

[56] References Cited

U.S. PATENT DOCUMENTS

| | | | |
|---|---|---|---|
| 3,258,767 | 6/1966 | Jacobsen | 342/175 |
| 3,394,372 | 7/1968 | Schrader | 342/175 |
| 3,396,388 | 8/1968 | Goldie | 342/198 |
| 3,564,258 | 2/1971 | Feingold | 455/80 |
| 3,745,567 | 7/1973 | Quinn et al. | 342/198 |
| 3,761,924 | 9/1973 | McGowan | 342/198 |
| 4,044,357 | 8/1977 | Goldie | 342/200 |
| 4,725,842 | 2/1988 | Mayberry | 342/198 |

*Primary Examiner*—John B. Sotomayor
*Attorney, Agent, or Firm*—Robert M. Asher

[57] ABSTRACT

A method and apparatus for suppressing leakage spikes in a radar duplexer. A flash of radiant energy is triggered immediately prior to sending a radar pulse so as to ionize the gases in a duplexer tube before the leading edge of the radar pulse reaches the tube. The spike suppressor includes an radiant energy source which attaches to the radar duplexer so that the source shines into the duplexer tube. A pulse generator is provided for activating the source in response to a trigger signal.

16 Claims, 2 Drawing Sheets

RADAR DUPLEXER LEAKAGE SPIKE SUPPRESSOR

BACKGROUND OF THE INVENTION

The government has rights in this invention pursuant to Contract Number F19628-90-C-00032 awarded by the Department of the Air Force.

The present invention is directed to an apparatus and method for suppressing leakage spikes in a radar duplexer which uses a gas filled duplexer tube.

A duplexer allows a radar system to use the same antenna for transmission and reception of pulsed electromagnetic energy, such as, in particular, radar pulses. Some high power radar systems use a gas filled quartz tube mounted in a microwave device having a tuned cavity to form a duplexer. Upon radar transmission, the gas inside the duplexer tube is ionized by the incident radar pulse into a hot plasma. The plasma forms a low resistance across the cavity acting almost like a short circuit to substantially block off the receiver port from the radar pulse, reflecting it to the antenna port. Several hundred microseconds after the trailing edge of the radar pulse leaves the duplexer tube, the ions inside the duplexer tube recombine. In this second state, the echo signal is allowed past the duplexer tube into the receiver port of the microwave device. The echo signal is of much lower energy than the transmit pulse, thus the gases in the duplexer tube are not ionized by the echo signal. Thus, the echo signal can pass through the duplexer tube. The duplexer tube is designed to protect the sensitive receiver electronics from the high power of the transmitting radar pulse.

Unfortunately, the duplexer gas does not ionize immediately. Thus, during the initial contact of the leading edge of the radar pulse with the duplexer tube, some high power does leak through the duplexer tube into the receiver channel. The amount of leakage increases with the age of the duplexer tube since the gas inside the tube is slowly adsorbed by the tube wall over time. In order to protect the receiver electronics from this leakage spike at the beginning of a radar pulse, electrically lossy protective devices, such as backup duplexers or limiters, are generally employed between the receiver port and the receiver electronics. While these devices reduce the leakage energy to tolerable levels for the receiver, they also have the disadvantage of reducing the sensitivity of the receiver to the echo signal. The protective devices have the effect of attenuating the echo signal as well as the undesired leakage spike.

It is an object of the present invention to provide a apparatus and method for substantially reducing leakage spikes through a duplexer tube.

SUMMARY OF THE INVENTION

The present invention is directed to a radar duplexer spike suppressor in which an radiant energy source, such as a flash lamp, is attached to the radar duplexer in such a way as to expose the duplexer tube to the energy from the source. A timing mechanism is used to trigger the radiant source immediately prior to transmitting a radar pulse. Thus, the gases in the duplexer tube are somewhat pre-ionized by this source prior to arrival of the leading edge of the radar pulse at the duplexer tube. Thus, the duplexer tube is partially ionized as the leading edge arrives, thereby minimizing the fraction of the outgoing signal which leaks past the duplexer. Merely a flash of energy is required to suppress the leakage spike, after which the radar signal itself provides enough energy to intensify and maintain the plasma within the duplexer tube. The light pulse decays before the radar signal trailing edge reaches the duplexer tube. After the radar signal trailing edge passes the duplexer tube, the ions in the tube recombine so that the receiver may pick up the echo signal.

By using the spike suppressor apparatus and method of the present invention, less extensive electrical lossy protective devices can be used in the receiver port so that the echo signal does not need to be as attenuated as it is in the prior art. Thus, the receiver used with a radar duplexer having a suppressor of the present invention can be made more sensitive to low level signals in the echo.

Other objects and advantages of the present invention will become apparent during the following description of the presently preferred embodiment of the invention taken in conjunction with the drawings.

DETAILED DESCRIPTION OF THE PREFERRED EMBODIMENT

Figure 1:
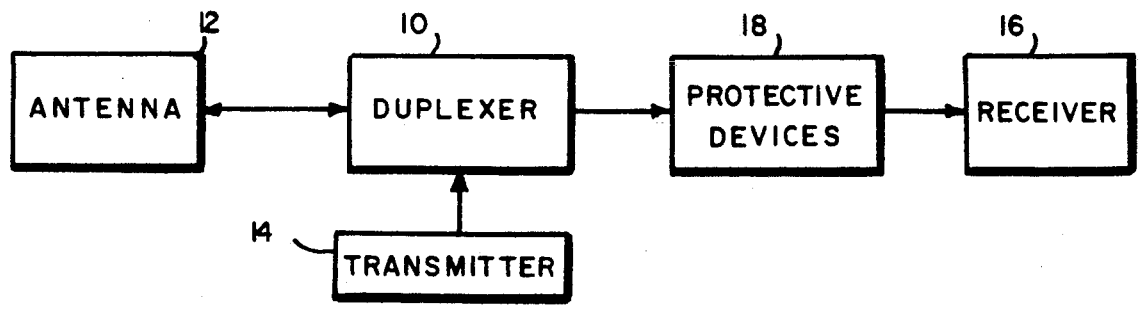
FIG. 1 is a basic schematic of a radar system using a duplexer.

The leakage spike suppressor of the present invention is for use in a duplexed radar system such as that schematically illustrated in FIG. 1. A duplexer 10 acts as a switch permitting an antenna 12 to be used both for transmission and reception. A transmitter 14 sends series of high power radar pulses into the duplexer 10. The present invention is designed for use with duplexers of the type that use a gas filled tube. The gas in the tube becomes ionized by the radar pulse from the transmitter 14. The ionized gas (plasma) acts as an electrical low resistance circuit which reflects the radar pulse away from the port connected to the receiver. The ions inside the duplexer recombine after the trailing edge of the radar pulse. Thus, the returning echo signals are permitted into the receiver 16 through the duplexer 10 once the plasma has decayed.

Leakage spikes occur when the leading edge of the radar pulse from the transmitter 14 reaches the duplexer tube 10. Since the duplexer tube is not fully ionized immediately, some of the power leaks by the duplexer tube towards the receiver 16 until the gases are completely ionized. Thus, an initial leakage spike of power is directed toward the receiver 16. In order to protect the sensitive receiver electronics, protective devices 18 are generally used in a receiver port to protect the receiver electronics. Electrically lossy protective devices such as backup duplexers and limiters are usually employed.

Figure 2:
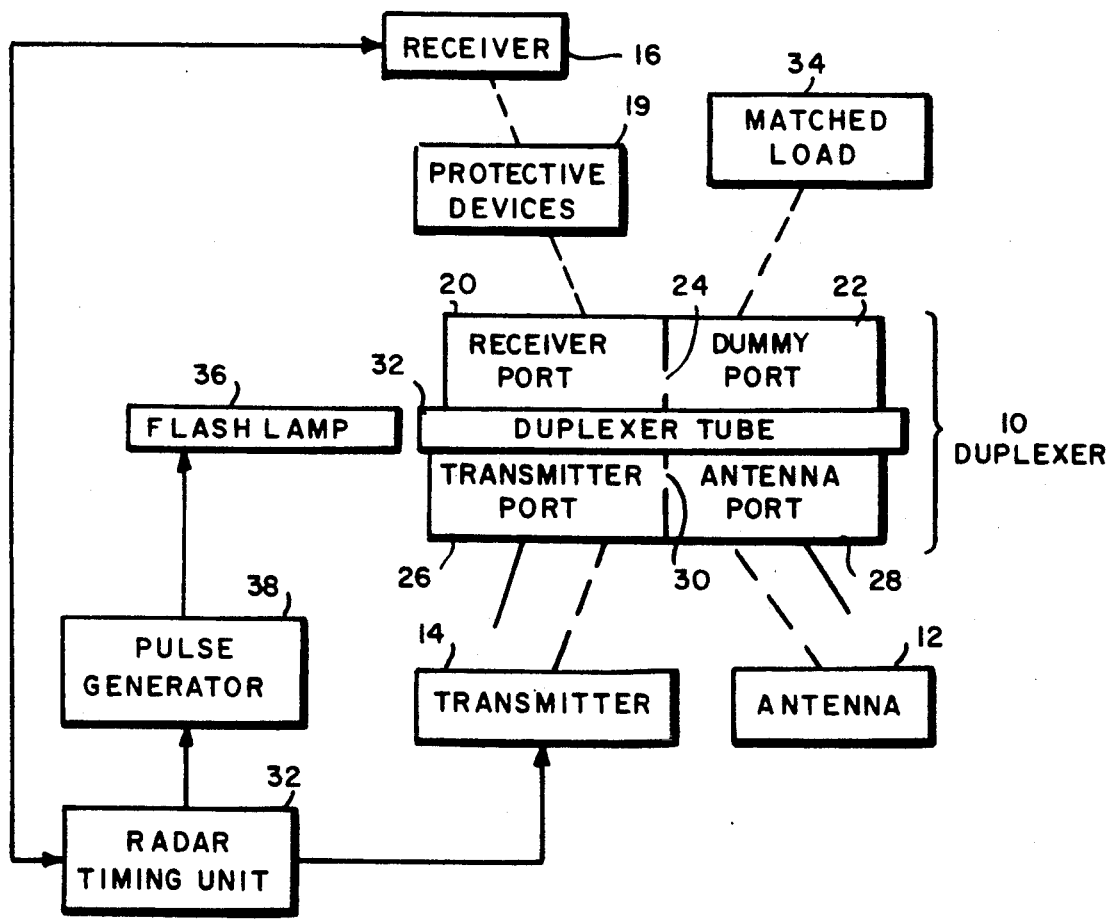
FIG. 2 is a schematic of a duplexed radar system using the present invention.

Referring now to FIG. 2, a duplexed system using the leakage spike suppressor of the present invention is shown. The duplexer 10 illustrated in FIG. 2 is a four port hybrid duplexer. The present invention is not limited to use with such a duplexer as it would also be effective with any other duplexer using a gas filled duplexer tube. The hybrid four port duplexer provides an opening between the two ports on the upper and lower portions of the duplexer. The duplexer 10 is shown with a receiver port 20 and a dummy port 22 in its upper portion. An opening 24 is made in the wall between these two ports. In the lower portion of the duplexer is a transmitter port 26 and an antenna port 28 with an opening 30 in the wall separating the transmitter and antenna ports. A duplexer tube 32 separates the upper and lower portions of the duplexer 10. In accordance with the presently preferred embodiment, the duplexer tube may be a Varian BLA-086 quartz tube filled with chlorine and argon gas.

A transmitter 14 provides high power r.f. energy into the transmitter port 26 of the duplexer 10. A radar timing unit 32 is the electronic control which determines the timing for activating the transmitter 14. The timing unit 32 also controls the receiver 16. In response to signals from the timing unit 32, the receiver 16 knows when to expect to receive the radar echo. The receiver 16 is attached or connected through a series of protective devices 19 to the receiver port 20. It is contemplated that when using the radar duplexer spike suppressor of the present invention that the protective devices 19 need not be as extensive as those used in the prior art. A matched load 34 is hooked up to the dummy port 22. The load 34 is matched with the impedance of the protective devices 19 and the receiver 16 so as to maximize the strength of the radar echoes received by the receiver 16. The antenna 12 is connected by waveguide to the antenna port 28 of the duplexer.

Basically, the duplexed system operates by having the radar timing unit 32 activate the transmitter 14 to send a radar pulse into the radar port 26. The radar pulse ionizes the duplexer tube 32. The ionized duplexer tube reflects the radar pulse so that it passes through the opening 30 into the adjacent port and out to the antenna 12. Once the radar pulse leaves, the duplexer tube 32 deionizes and echoes picked up by the antenna 12 are passed through the antenna port 28 past the duplexer tube 32 and out through receiver ports 20. The receiver 16 picks up the radar echo for processing and analysis. The protective devices 19 attenuate the radar echo somewhat before the receiver 16 receives it.

In accordance with the present invention, a light source, such as an ultraviolet flash lamp 36 is aligned with the gas filled duplexer tube 32. The alignment of the flash lamp 36 is not critical as long as it adequately illuminates the gas in the duplexer tube 32 without distorting the electric and magnetic fields. It is desirable to place the flash lamp close to the duplexer tube to maximize the spike suppression. However, the duplexer tube gets hot during operation. Thus, without adding a cooling mechanism, it has been found that a ½ inch separation between the lamp 36 and the duplexer tube 32 avoids overheating and achieves spike suppression.

A pulse generator 38 is provided for activating the flash lamp 36 in response to a trigger from the timing unit 32. The pulse generator may be any conventional pulse generator such as an EG&G PS302 power supply and the flash lamp may be an ultraviolet lamp also known to be manufactured by EG&G. The pulse generator 38 causes the light source 36 to give off a flash of radiant energy. In the case of the ultraviolet tube, a flash of ultraviolet light is shined on the gas filled duplexer tube 32. The ultraviolet light causes the rarefied gas mixture to ionize.

Basic quantum theory dictates that an atom can be ionized when it absorbs a photon having an energy greater than the atom's Work Function Energy. The Work Function Energy is defined as the minimum amount of energy needed to ionize an electron in a given orbital. The energy of a photon is given by:

$$E = h\nu$$

where:
 E = the energy of a photon
 H = Planck's Constant
 v = the frequency of a photon This implies that ionization by photons is dependent upon the frequency of the incident light, not the intensity of the light. Put another way, the wavelength of the incident light (which is proportional to 1/frequency) must be shorter than the critical wavelength in order for ionization to occur. Argon and chlorine can be ionized by UV light with a wavelength under roughly 100 nm. At least a portion of the light from the flash lamp must have a wavelength less than the critical wavelength for the gases in the duplexer tube to ionize. In accordance with these calculations, X rays may be substituted for the ultraviolet light to ionize the gases.

The flash lamp 36 must be activated immediately prior to the sending of a radar pulse from the transmitter 14. In accordance with the presently preferred embodiment, the timing unit 32 triggers the pulse generator 38 one microsecond prior to the leading edge of the high power transmitter radar pulse. The timing should be adjusted to obtain the best results on a given system. The object is to eliminate or at least substantially reduce the leakage spike caused in the first 40 nanoseconds of the transmitted radar pulse. By ionizing the gas in the duplexer tube 32 before the transmitted radar pulse reaches the duplexer tube 32, a low resistance path has already been produced by the duplexer tube and thus most if not all of the transmitted energy is reflected out and prevented from passing through to the receiver 16. However, the flash should be activated as little in advance of the leading edge of the radar pulse as is possible to still achieve spike suppression without unnecessarily curtailing the reception period for picking up the echo signals. The flash of light from the tube 36 must be long enough to significantly suppress the leakage spike in the first 40 nanoseconds but must be short enough so as not to interfere with deionization of the duplexer tube 32 following the trailing edge of the radar pulse from the transmitter 14.

The present invention has been found to advantageously attenuate the leakage spike in excess of 5 dB. 20 dB suppression has been obtained with the present invention. The flash lamp has further been shown to reduce arcing in the ports of the duplexer 10. The main benefit of the invention is the reduction of the leakage which in turn permits a reduced use of protective devices so as to minimize the attenuation of the returned radar echoes. Thus, the duplexed system achieves greater sensitivity.

Figure 3:
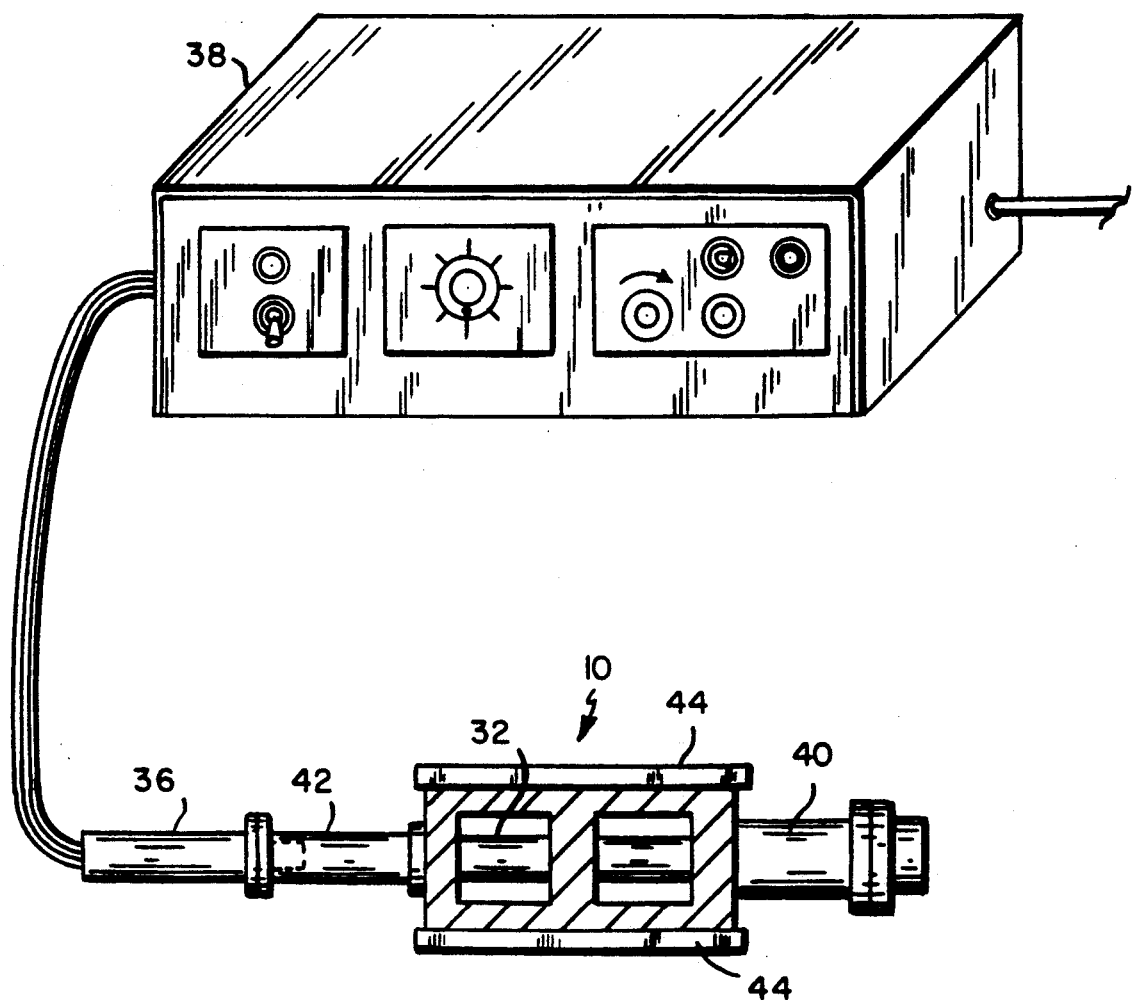
FIG. 3 is a perspective view in partial cross-section of a four port hybrid duplexer with a radar duplexer spike suppressor of the present invention.

Referring now to FIG. 3, the duplexer 10 has been cut away to show the duplexer tube mount. The duplexer 10 is provided with big heat fins 44 to assist in cooling the duplexer during operation. The duplexer tube 32 is shown extending across the two cavities of the duplexer 10 One end of the duplexer tube may contain a reservoir 40 to increase the gas supply. The other end of the duplexer tube 32 extends out through an aluminum sleeve 42 which is attached to the duplexer 10. The other end of the aluminum sleeve 42 is securely attached to the flash tube 36 so as to securely align the flash tube with the duplexer tube 32. The flash tube 36 is plugged into a socket with wires extending therefrom for connection to the pulse generator 38. The pulse generator 38 receives a trigger from the radar timing unit 32 which is used to initiate the electrical pulse to the flash tube 36.

Of course, it should be understood that various changes and modifications to the preferred embodiments described above will be apparent to those skilled in the art. For example, X-rays may be substitutable for the ultraviolet flash, duplexer tubes containing other gases such as oxygen, neon, hydrogen or water vapor may also benefit from the invention and the spike suppressor may be used with other duplexer designs including three port duplexers. These and other changes can be made without departing from the spirit and scope of the invention and without diminishing its attendant advantages. It is therefore intended that such changes and modifications be covered by the following claims.

We claim:

1. A radar duplexer spike suppressor comprising:
an radiant energy source;
means for attaching said radiant energy source external to a duplexer tube of a radar duplexer such that said duplexer tube is exposed to energy radiated by said source, said energy causing gases in said duplexer tube to ionize; and
timing means, coupled to said energy source, for activating said source at a specific time relative to when a radar pulse having a leading edge and a trailing edge is sent to said duplexer.

2. The radar duplexer spike suppressor of claim 1 wherein said radiant energy source comprises an ultraviolet flash lamp.

3. The radar duplexer spike suppressor of claim 1 wherein said radiant energy source comprises a source of X-rays.

4. The radar duplexer spike suppressor of claim 1 wherein said timing means activates said radiant energy source immediately prior to the leading edge of said radar pulse so that gases in said duplexer tube are already ionized when said radar pulse reaches said duplexer tube.

5. The radar duplexer spike suppressor of claim 1 wherein said timing means comprises a pulse generator and a radar timing unit for triggering said pulse generator.

6. A method of suppressing leakage spikes in a radar duplexer comprising the steps of:
triggering a trigger signal immediately prior to sending a radar signal; and
radiating a flash of radiant energy into a duplexer tube in response to said trigger signal, said flash of radiant energy causing gases in said duplexer tube to ionize.

7. The method of claim 6 wherein said step of radiating comprises radiating a flash of ultraviolet light.

8. The method of claim 6 wherein said step of radiating comprises radiating a flash of X-rays.

9. A radar duplexer comprising:
a microwave device having a transmit port, a receiver port and an antenna port;
a duplexer tube mounted within said microwave device;
a radiant energy source mounted on said microwave device external to said duplexer tube so that radiant energy from said source radiates into said duplexer tube, said radiant energy causing gases in said duplexer tube to ionize; and
timing means for activating said radiant energy source immediately prior to transmitting a radar pulse so that the gases in said duplexer tube are ionized when said radar pulse reaches said duplexer tube.

10. The radar duplexer of claim 9 wherein said duplexer tube contains chlorine and argon gases.

11. The radar duplexer of claim 10 wherein said radiant energy source comprises an ultraviolet flash lamp.

12. The radar duplexer of claim 10 wherein said radiant energy source comprises a source of X-rays.

13. The radar duplexer of claim 9 wherein said radiant energy source provides a flash of radiant energy so that said flash does not extend beyond said radar pulse.

14. The radar duplexer spike suppressor of claim 1 wherein said radiant energy source comprises a source of light having a wavelength short enough such that said light can ionize the gas in said duplexer tube.

15. The method of claim 6 wherein said step of radiating comprises radiation a flash of light energy having a short enough wavelength such that said light energy ionizes the gas in said duplexer tube.

16. The radar duplexer of claim 9 wherein said radiant energy source comprises a source of light energy having a wavelength sufficiently short such that said light energy can ionize the gas in said duplexer tube.

* * * * *